United States Patent
Endo

(10) Patent No.: US 12,330,669 B2
(45) Date of Patent: Jun. 17, 2025

(54) VEHICLE INFORMATION PROCESSING DEVICE, VEHICLE INFORMATION PROCESSING SYSTEM, AND VEHICLE INFORMATION PROCESSING METHOD

(71) Applicant: TOYOTA JIDOSHA KABUSHIKI KAISHA, Toyota (JP)

(72) Inventor: Masato Endo, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 209 days.

(21) Appl. No.: 18/143,885

(22) Filed: May 5, 2023

(65) Prior Publication Data

US 2024/0025434 A1    Jan. 25, 2024

(30) Foreign Application Priority Data

Jul. 25, 2022    (JP) .................. 2022-118292

(51) Int. Cl.
*B60W 50/10*    (2012.01)
*G01C 21/36*    (2006.01)

(52) U.S. Cl.
CPC ......... *B60W 50/10* (2013.01); *G01C 21/3605* (2013.01)

(58) Field of Classification Search
None
See application file for complete search history.

(56) References Cited

U.S. PATENT DOCUMENTS

| | | | |
|---|---|---|---|
| 2005/0282519 A1 | 12/2005 | Kobayashi et al. | |
| 2013/0311003 A1* | 11/2013 | Abo | G07C 5/008 701/2 |
| 2016/0316358 A1* | 10/2016 | Orr | H04W 8/22 |
| 2017/0262277 A1 | 9/2017 | Endo et al. | |
| 2018/0018591 A1* | 1/2018 | Shiraishi | A63F 13/30 |
| 2021/0179138 A1 | 6/2021 | Terazawa et al. | |
| 2022/0396218 A1 | 12/2022 | Ono | |
| 2023/0325168 A1* | 10/2023 | Lewandowski | B60W 40/09 717/118 |

FOREIGN PATENT DOCUMENTS

| | | |
|---|---|---|
| JP | 2017-167646 A | 9/2017 |
| JP | 2018-097764 A | 6/2018 |
| JP | 2020-038200 A | 3/2020 |
| JP | 2021-082064 A | 5/2021 |
| WO | 2004/046985 A1 | 6/2004 |

\* cited by examiner

*Primary Examiner* — Wade Miles
*Assistant Examiner* — Arslan Azhar
(74) *Attorney, Agent, or Firm* — Dinsmore & Shohl LLP

(57) ABSTRACT

A vehicle information processing device includes: a reception unit that receives a selection of a user of an introduction mode of a setting related to driving assistance of a vehicle; and a setting change unit that applies the setting to the vehicle under a predetermined condition in accordance with the selection by the user, the selection being a selection that has been received by the reception unit, when the user selects an introduction mode for trial usage in which the setting is applied to the vehicle under the predetermined condition.

7 Claims, 11 Drawing Sheets

VEHICLE INFORMATION PROCESSING DEVICE, VEHICLE INFORMATION PROCESSING SYSTEM, AND VEHICLE INFORMATION PROCESSING METHOD

CROSS-REFERENCE TO RELATED APPLICATION

This application claims priority to Japanese Patent Application No. 2022-118292 filed on Jul. 25, 2022 incorporated herein by reference in its entirety.

BACKGROUND

1. Technical Field

The present disclosure relates to a vehicle information processing device, a vehicle information processing system, and a vehicle information processing method.

2. Description of Related Art

Japanese Unexamined Patent Application Publication No. 2018-097764 (JP 2018-097764 A) discloses an in-vehicle data update device capable of autonomously resuming an update even when an update of in-vehicle software or the like is incomplete.

SUMMARY

When introducing a setting to a vehicle, the user may hesitate to introduce it, not knowing whether the option is suitable for him/her. In addition, although the user does not want to use the function all the time, the user may want to use it under a predetermined condition.

In consideration of the above fact, it is an object of the present disclosure to provide a vehicle information processing device, a vehicle information processing system, and a vehicle information processing method that can alleviate a user's reluctance to introduce settings to a vehicle.

A vehicle information processing device according to a first aspect includes: a reception unit that receives a selection of a user of an introduction mode of a setting related to driving assistance of a vehicle; and a setting change unit that applies the setting to the vehicle under a predetermined condition in accordance with the selection by the user, the selection being a selection that has been received by the reception unit, when the user selects an introduction mode for trial usage in which the setting is applied to the vehicle under the predetermined condition.

According to the first aspect of the present disclosure, when the user selects the introduction mode of the setting related to driving assistance of the vehicle, the selection is received by the reception unit. Here, when the user selects the introduction mode for the trial usage in which the setting is applied to the vehicle under a predetermined condition, the setting change unit applies the setting to the vehicle under the predetermined condition corresponding to the user's selection. In other words, the user can use the setting of interest under a predetermined condition for trial usage. Therefore, even a user who hesitates to apply the setting to the vehicle as the introduction for the normal usage without conditions can easily apply the setting to the vehicle.

In the vehicle information processing device according to a second aspect, in the disclosure according to the first aspect, the setting change unit cancels application of the setting to the vehicle when a predetermined end condition set in advance is satisfied.

According to the second aspect of the present disclosure, the setting change unit cancels the application of the setting to the vehicle when the predetermined end condition set in advance is satisfied. Thus, the application of the setting to the vehicle is automatically canceled without the user performing complicated operations.

The vehicle information processing device according to a third aspect further includes, in the disclosure according to the second aspect: an acquisition unit that acquires information related to any one of an elapsed time, a travel time, and a travel distance; and a determination unit that determines whether the end condition is satisfied based on the information acquired by the acquisition unit. The end condition is any one of a case where a predetermined time has elapsed since an introduction of the setting, the vehicle has traveled for a predetermined time since the introduction of the setting, and the vehicle has traveled for a predetermined distance since the introduction of the setting, in accordance with the information acquired by the acquisition unit. The setting change unit cancels the application of the setting to the vehicle when the determination unit determines that the end condition is satisfied.

According to the third aspect of the present disclosure, the acquisition unit acquires information related to any one of the elapsed time, the travel time, and the travel distance. Further, based on the acquired information, the determination unit determines whether a predetermined end condition corresponding to the user's selection is satisfied. When the determination unit determines that the end condition is satisfied, that is, in any one of the cases where a predetermined time has elapsed since the introduction of the setting, the vehicle has traveled for a predetermined time since the introduction of the setting, and the vehicle has traveled a predetermined distance since the introduction of the setting, the setting change unit cancels the application of the setting to the vehicle. This allows the user to use the setting of interest for the trial usage only for a predetermined time or a predetermined distance.

In the vehicle information processing device according to a fourth aspect, in the disclosure according to the first aspect, the setting change unit does not apply the setting to the vehicle when the vehicle is not used under a predetermined usage condition set in advance, and applies the setting to the vehicle when the vehicle is used under the usage condition.

According to the fourth aspect of the present disclosure, when the vehicle is not used under the predetermined usage condition set in advance, the setting change unit does not apply the setting to the vehicle. On the other hand, when the vehicle is used under the predetermined usage condition, the setting change unit applies the setting to the vehicle. Therefore, the user can use the setting of interest for the trial usage only when using the vehicle under a predetermined usage condition that the user has determined necessary and selected.

The vehicle information processing device according to a fifth aspect further includes, in the disclosure according to the fourth aspect: an acquisition unit that acquires information related to any one of a travel time zone, a travel route, a travel area, and a driver of the vehicle; and a determination unit that determines whether the usage condition is satisfied based on the information acquired by the acquisition unit. The usage condition is any one of a case where the vehicle travels in a predetermined time zone, the vehicle travels on a predetermined route, the vehicle travels in a predetermined area, and a predetermined driver drives the vehicle, in accordance with the information acquired by the acquisition unit. The setting change unit does not apply the setting to the vehicle when the determination unit determines that the usage condition is not satisfied, and applies the setting to the vehicle when the determination unit determines that the usage condition is satisfied.

According to the fifth aspect of the present disclosure, the acquisition unit acquires information related to any one of the travel time zone, the travel route, the travel area, and the driver. Furthermore, based on the acquired information, the determination unit determines whether a predetermined usage condition corresponding to the user's selection is satisfied.

When the determination unit determines that the usage condition is satisfied, that is, in any one of the cases where the vehicle travels during a predetermined time zone, the vehicle travels along a predetermined route, the vehicle travels in a predetermined area, and a predetermined driver drives the vehicle, the setting change unit applies the setting to the vehicle. Therefore, the user can use the setting of interest for the trial usage when the vehicle travels during a predetermined time zone, when the vehicle travels along a predetermined route, when the vehicle travels in a predetermined area, or when a predetermined driver drives the vehicle.

The vehicle information processing device according to a sixth aspect further includes, in the disclosure according to the first aspect, an acquisition unit that acquires information related to a usage amount of at least one of a time when the setting was used and a distance traveled by the vehicle using the setting; and a fee charging unit that charges the user with a fee corresponding to the usage amount based on the information related to the usage amount, the information being information acquired by the acquisition unit.

According to the sixth aspect of the present disclosure, the acquisition unit acquires information related to the usage amount of at least one of the time the setting was used and the distance traveled by the vehicle using the setting. Further, based on the acquired information related to the usage amount, the fee charging unit charges the user with the fee corresponding to the usage amount. Therefore, the user can use the setting of interest for the trial usage by paying the fee only for the amount used.

The vehicle information processing device according to a seventh aspect further includes, in the disclosure according to the first aspect, an inquiry unit that inquires of the user whether the user wishes to continue using the setting. The setting change unit cancels application of the setting to the vehicle when the user does not wish to continue using the setting in response to an inquiry by the inquiry unit, and maintains a usable state of the setting when the user wishes to continue using the setting in response to the inquiry by the inquiry unit.

According to the seventh aspect of the present disclosure, the inquiry unit inquires of the user whether he or she wishes to continue using the setting. When the user does not wish to continue using the setting in response to the inquiry by the inquiry unit, the setting change unit cancels the application of the setting to the vehicle. On the other hand, when the user wishes to continue using the setting in response to the inquiry by the inquiry unit, the setting change unit maintains the state in which the setting can be used.

A vehicle information processing system according to an eighth aspect includes: the vehicle information processing device according to any one of the first aspect to the seventh aspect; and a vehicle-mounted device that controls the vehicle in accordance with the setting.

According to the eighth aspect of the present disclosure, when the user selects the introduction mode of the setting related to driving assistance of the vehicle, the selection is received by the reception unit of the vehicle information processing device. Here, when the user selects the introduction mode for the trial usage in which the setting is applied to the vehicle under a predetermined condition, the setting change unit of the vehicle information processing device applies the setting to the vehicle under the predetermined condition corresponding to the user's selection. The vehicle is then controlled by the vehicle-mounted device in accordance with the applied setting. In other words, the user can use the setting of interest under a predetermined condition for trial usage. Therefore, even a user who hesitates to apply the setting to the vehicle as the introduction for the normal usage without conditions can easily apply the setting to the vehicle.

An vehicle information processing method according to a ninth aspect includes: receiving a selection by a user of an introduction mode of a setting related to driving assistance of a vehicle; and applying the setting to the vehicle under a predetermined condition in accordance with the selection by the user, when the user selects an introduction mode for trial usage in which the setting is applied to the vehicle under the predetermined condition.

According to the ninth aspect of the present disclosure, when the user selects the introduction mode of the setting related to driving assistance of the vehicle, the selection is received. Here, when the user selects the introduction mode for the trial usage in which the setting is applied to the vehicle under a predetermined condition, the setting is applied to the vehicle under the predetermined condition corresponding to the user's selection. In other words, the user can use the setting of interest under a predetermined condition for trial usage. Therefore, even a user who hesitates to apply the setting to the vehicle as the introduction for the normal usage without conditions can easily apply the setting to the vehicle.

As described above, the vehicle information processing device according to the present disclosure described in the first aspect has an effect that the user's reluctance to introduce settings to the vehicle can be alleviated.

The vehicle information processing device according to the present disclosure described in the second aspect has an effect that the user's trouble of canceling the application of the setting can be saved.

The vehicle information processing device according to the present disclosure described in the third aspect has an effect that the user can use the setting of interest only for a predetermined time or a predetermined distance for trial usage.

The vehicle information processing device according to the present disclosure described in the fourth aspect has an effect that the user can use the setting of interest under a predetermined usage condition for trial usage.

The vehicle information processing device according to the present disclosure described in the fifth aspect has an effect that the user can use the setting of interest only when the vehicle travels during a predetermined time zone, when the vehicle travels along a predetermined route, when the vehicle travels in a predetermined area, or when a predetermined driver drives the vehicle, for trial usage.

The vehicle information processing device according to the present disclosure described in the sixth aspect has an effect that the user can use the setting by paying according to the usage amount.

The vehicle information processing device according to the present disclosure described in the seventh aspect has an effect that the user's reluctance to introduce settings to the vehicle can be further alleviated.

The vehicle information processing system according to the present disclosure described in the eighth aspect has an effect that the user's reluctance to introduce settings to the vehicle can be alleviated.

The vehicle information processing method according to the present disclosure described in the ninth aspect has an effect that the user's reluctance to introduce settings to the vehicle can be alleviated.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A vehicle information processing system 10 according to an embodiment of the present disclosure will be described below with reference to FIGS. 1 to 11.

Overall Configuration

Figure 1:
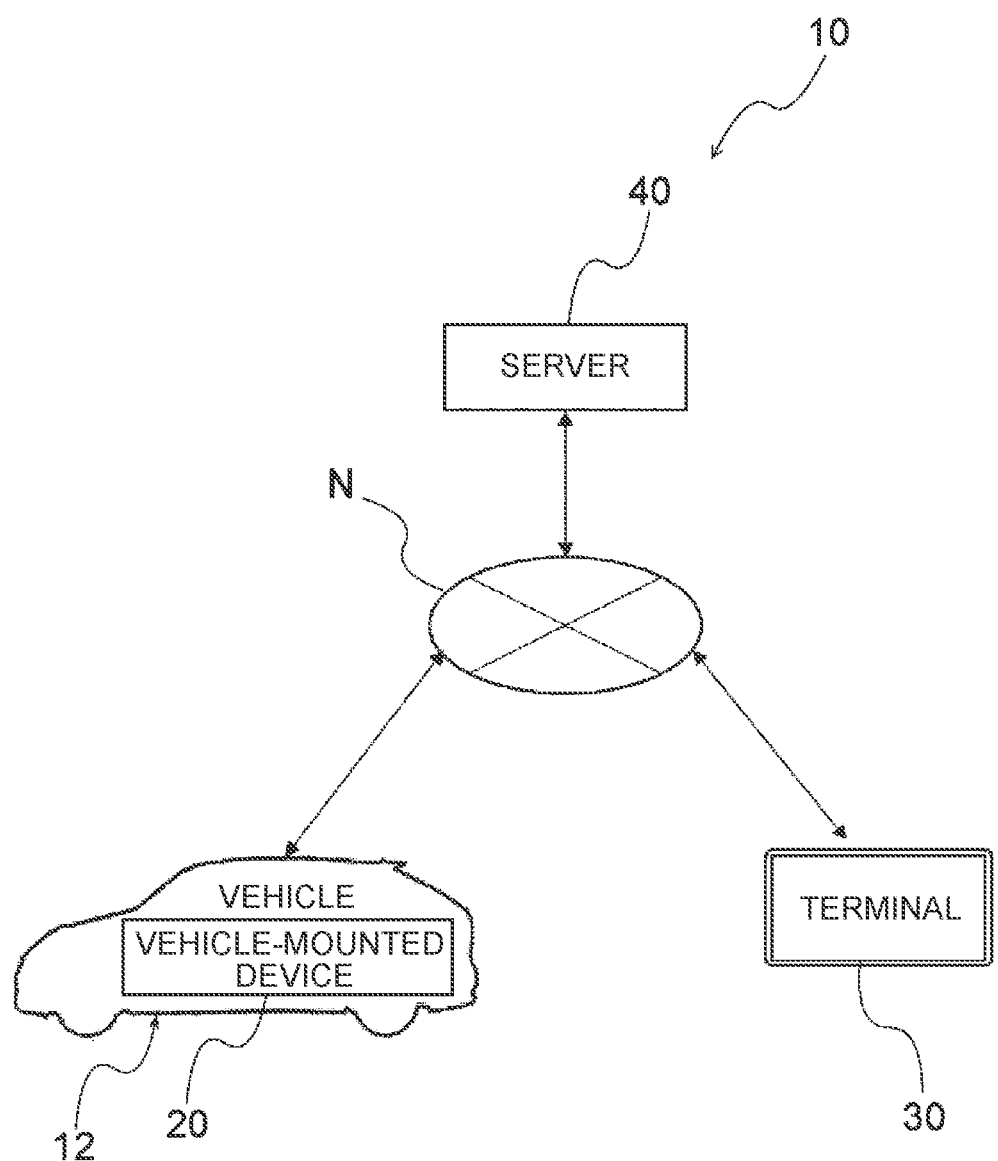
FIG. 1 is a diagram showing a schematic configuration of a vehicle information processing system according to the present embodiment.

As shown in FIG. 1, the vehicle information processing system 10 of the present embodiment includes a vehicle 12 of a user, a terminal 30 of the user, and a server 40 serving as a vehicle information processing device owned by a predetermined business operator. The vehicle 12 is equipped with a vehicle-mounted device 20. Examples of the terminal 30 include a smart phone and a personal computer owned by the user. The vehicle-mounted device 20, the terminal 30, and the server 40 are connected via a network N and can communicate with each other. Although a plurality of vehicles 12 is connected to the network N, only one vehicle 12 is shown in FIG. 1 for convenience of explanation.

Hardware Configuration of Vehicle 12

Figure 2:
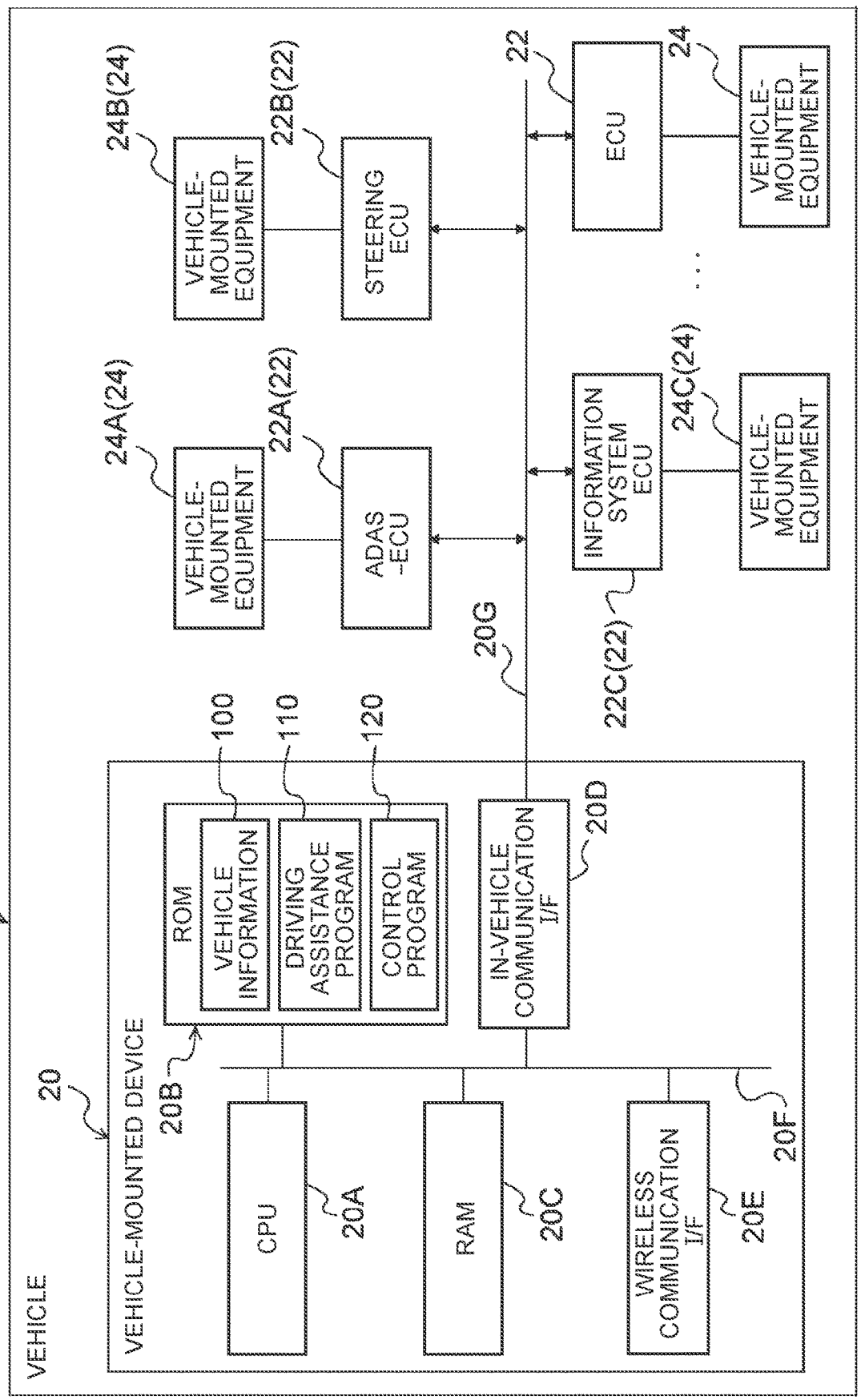
FIG. 2 is a block diagram showing a hardware configuration of a user's vehicle shown in FIG. 1.

As shown in FIG. 2, the vehicle 12 includes the vehicle-mounted device 20, a plurality of electronic control units (ECUs) 22, and a plurality of vehicle-mounted equipment 24. The vehicle-mounted device 20 controls the vehicle 12 in accordance with a driving assistance program 110 changed by the server 40. Examples of driving assistance include collision damage mitigation braking, lane departure warning, inter-vehicle distance control, skidding prevention, staggering warning, parking assistance, acceleration control when the pedal is depressed by mistake, and automatic switching of headlights, but are not limited to the above.

The vehicle-mounted device 20 includes a central processing unit (CPU) 20A, a read-only memory (ROM) 20B, a random access memory (RAM) 20C, an in-vehicle communication interface (I/F) 20D, and a wireless communication I/F 20E. The CPU 20A, the ROM 20B, the RAM 20C, the in-vehicle communication I/F 20D, and the wireless communication I/F 20E are connected so as to be able to communicate with each other via an internal bus 20F.

The CPU 20A is a central processing unit that executes various programs and controls various units. That is, the CPU 20A reads the program from the ROM 20B and executes the program using the RAM 20C as a work area. The CPU 20A controls each configuration described above and performs various arithmetic processes in accordance with the program recorded in the ROM 20B.

The ROM 20B stores various programs and various data. The ROM 20B stores vehicle information 100 such as vehicle type, model number, model year, etc., the driving assistance program 110 for controlling the vehicle 12 so as to assist the occupant's driving, and a control program 120 for controlling the vehicle-mounted device 20. The vehicle information 100 includes, in addition to the above-mentioned information such as the vehicle type that does not change from the time of purchase, for example, information such as the travel time, the travel distance, the travel route, the travel area, the driver, and the usage amount of a setting described later of the vehicle 12 acquired from the ECU 22.

The RAM 20C temporarily stores a program or data as a work area.

The in-vehicle communication I/F 20D is an interface for connecting to each of the ECUs 22. A communication standard based on a controller area network (CAN) protocol is used for the in-vehicle communication I/F 20D. The in-vehicle communication I/F 20D is connected to an external bus 20G.

The wireless communication I/F 20E is a wireless communication module for communicating with the server 40. For example, communication standards such as fifth generation (5G), long term evolution (LTE), and Wi-Fi (registered trademark) are used for the wireless communication I/F 20E. The wireless communication I/F 20E is connected to the network N.

As an example, the ECUs 22 include an advanced driver assistance system (ADAS)-ECU 22A, a steering ECU 22B, and an information system ECU 22C.

The ADAS-ECU 22A controls an advanced driver assistance system in an integrated manner. Vehicle-mounted equipment 24A is connected to the ADAS-ECU 22A. The vehicle-mounted equipment 24A includes a vehicle speed sensor, an acceleration sensor, and a yaw rate sensor. The vehicle-mounted equipment 24A also includes an external sensor group used to detect the surrounding environment of the vehicle 12. The external sensor group includes, for example, a camera that captures images of surrounding areas of the vehicle 12, a millimeter-wave radar that transmits an exploration wave and receives a reflective wave, a laser imaging detection and ranging (LiDAR) sensor that scans a front area of the vehicle 12, and the like.

The vehicle-mounted equipment 24A also includes an in-vehicle camera such as a drive recorder provided in the vehicle cabin. The vehicle-mounted device 20 is configured to be able to identify the driver from the image of the driver, which is captured by the in-vehicle camera.

The steering ECU 22B is connected to vehicle-mounted equipment 24B. The vehicle-mounted equipment 24B is a power steering device including a steering angle sensor.

The information system ECU 22C controls a car navigation system, a display, an audio, and the like. A global positioning system (GPS) device that constitutes vehicle-mounted equipment 24C is connected to the information system ECU 22C. The GPS device is a device that measures a current position of the vehicle 12. The GPS device includes an antenna (not shown) that receives signals from GPS satellites. For example, the display constituting the vehicle-mounted equipment 24C has a function as a display device that displays, as an image, various information including information received from the server 40, and a function as an input device that can input information by being operated by an occupant. The audio constituting the vehicle-mounted equipment 24C has a function of notifying the occupant of the information from the server 40 by sound. Note that, the GPS device, the display, and the audio may be directly connected to the vehicle-mounted device 20.

Functional Configuration of Vehicle-Mounted Device 20

Figure 3:
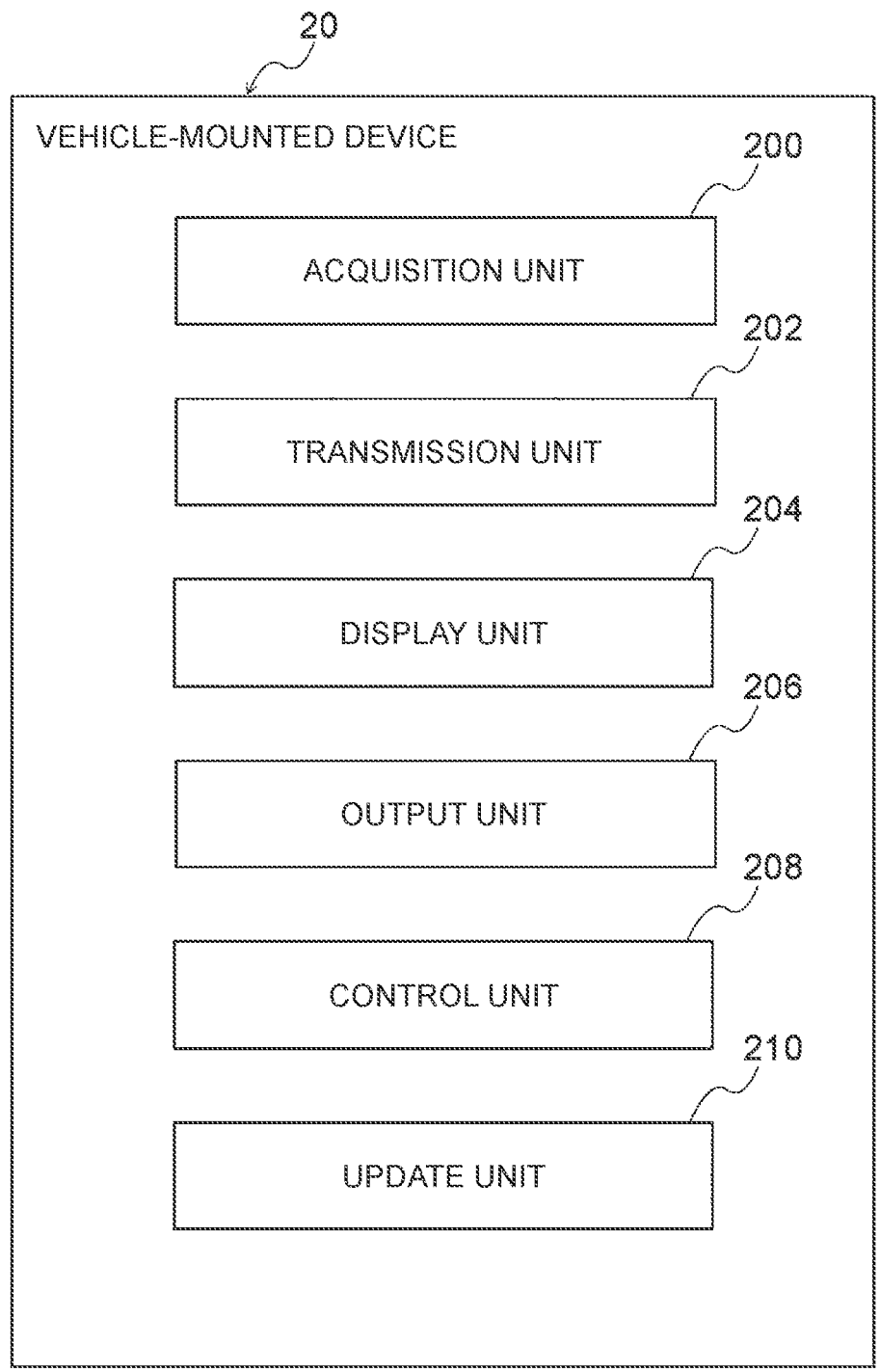
FIG. 3 is a block diagram showing a functional configuration of a vehicle-mounted device shown in FIG. 1.

As shown in FIG. 3, the vehicle-mounted device 20 functions as an acquisition unit 200, a transmission unit 202, a display unit 204, an output unit 206, a control unit 208, and an update unit 210 as the CPU 20A executes the control program 120.

The acquisition unit 200 has a function of acquiring signals from various sensors including the display, the GPS device, and the in-vehicle camera serving as the vehicle-mounted equipment 24.

The transmission unit 202 has a function of transmitting the vehicle information 100 stored in the ROM 20B to the server 40. The transmission unit 202 also has a function of transmitting a signal input on the display and acquired by the acquisition unit 200 to the server 40. Examples of the input of a signal on the display include a case where the user selects the introduction mode of a setting on the display of the vehicle 12.

The display unit 204 has a function of displaying an image transmitted from the server 40 on the display. For example, the display unit 204 displays, on the display, a selection screen for the introduction mode of the setting transmitted from the server 40.

The output unit 206 has a function of outputting, to a speaker of the audio, various sound data including voice data transmitted from the server 40.

The control unit 208 has a function of controlling the vehicle 12 based on the driving assistance program 110. The control unit 208 controls various actuators serving as the vehicle-mounted equipment 24 based on signals obtained from various sensors serving as the vehicle-mounted equipment 24.

The update unit 210 has a function of rewriting the driving assistance program 110 stored in the ROM 20B in accordance with information related to the setting transmitted from the server 40.

Hardware Configuration of Server 40

Figure 4:
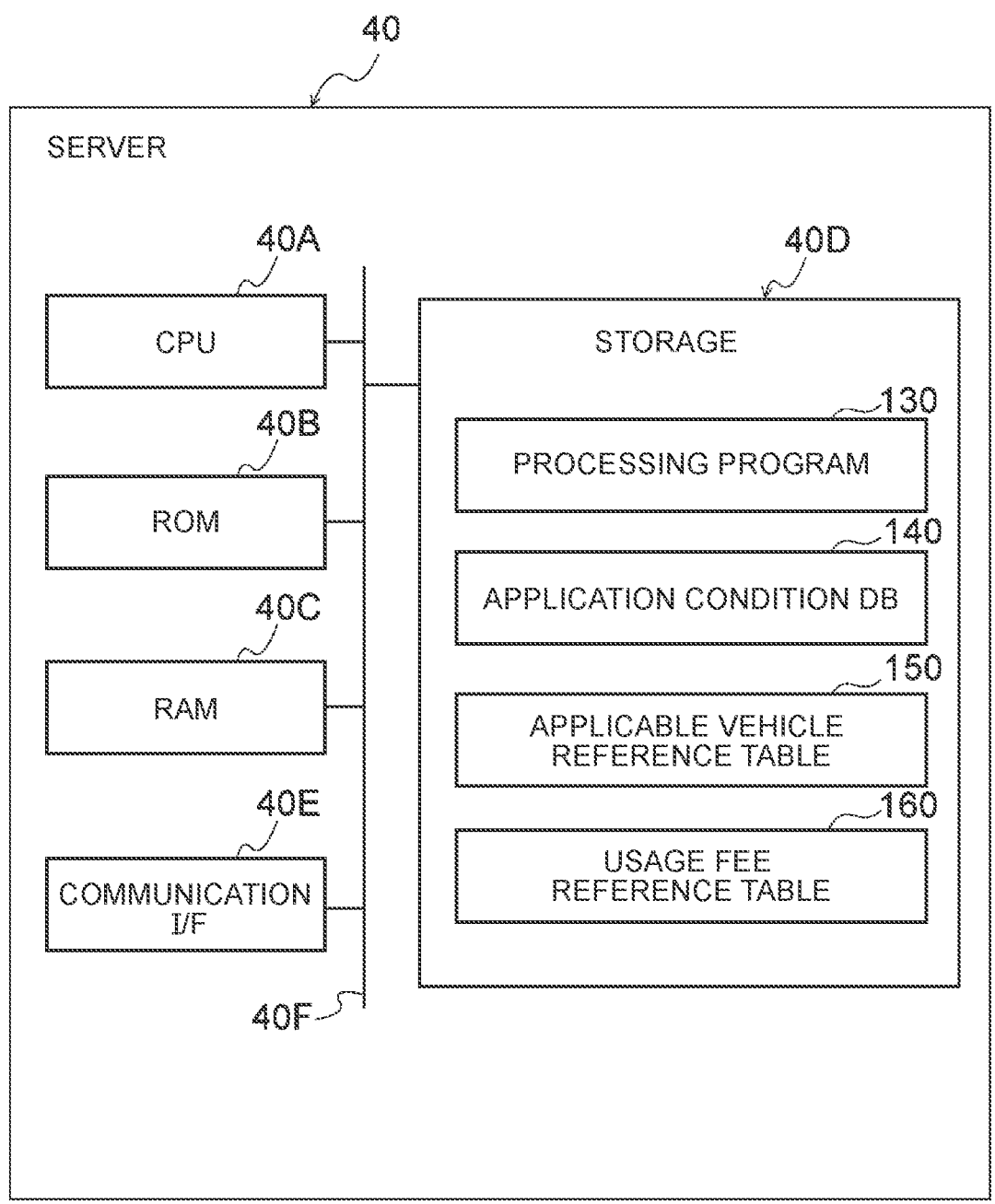
FIG. 4 is a block diagram showing a hardware configuration of a server shown in FIG. 1.

As shown in FIG. 4, the server 40 includes a CPU 40A, a ROM 40B, a RAM 40C, a storage 40D, and a communication I/F 40E. The CPU 40A, the ROM 40B, the RAM 40C, the storage 40D, and the communication I/F 40E are connected so as to be able to communicate with each other via an internal bus 40F. The functions of the CPU 40A, the ROM 40B, the RAM 40C and the communication I/F 40E are the same as those of the CPU 20A, the ROM 20B, the RAM 20C and the wireless communication I/F 20E of the vehicle-mounted device 20 described above.

The storage 40D serving as a memory is composed of a hard disk drive (HDD) or a solid state drive (SSD).

A processing program 130 for controlling the server 40 is stored in the storage 40D. Along with the execution of the processing program 130, the server 40 executes each process including an application process of applying the setting related to driving assistance to the vehicle 12 in accordance with the introduction mode selected by the user.

Here, the introduction mode of the setting includes, for example, introduction for normal usage and introduction for trial usage. When the setting is introduced to the vehicle 12 for the trial usage, the setting is applied to the vehicle 12 under a predetermined condition according to the user's selection. For example, the introduction for the trial usage includes an introduction with an end condition where there is a predetermined end condition and the setting can be used until the end condition is satisfied. Further, for example, the introduction for the trial usage includes an introduction with a usage condition where a setting can be used under a predetermined usage condition. Also, for example, the introduction for the trial usage includes an introduction of a usage-based charging system that allows using the setting by paying the fee only for the amount used. Processes in each introduction mode will be described later with reference to FIGS. 6 to 11.

An application condition DB 140 is stored in the storage 40D. The application condition DB 140 is a database related to various conditions corresponding to each introduction mode when a setting is introduced to the vehicle 12 for the trial usage.

Further, an applicable vehicle reference table 150 is stored in the storage 40D. The applicable vehicle reference table 150 stores a list of setting items related to driving assistance, and information on vehicles such as vehicle types, model numbers, and model years to which each setting item can be applied in each introduction mode.

Furthermore, a usage fee reference table 160 that stores coefficients for calculating the usage fee for each introduction mode of each setting is stored in the storage 40D.

In the present embodiment, it has been described that the storage 40D stores the processing program 130, the application condition DB 140, the applicable vehicle reference table 150, and the usage fee reference table 160, but the ROM 20B may store the processing program 130, the application condition DB 140, the applicable vehicle reference table 150, and the usage fee reference table 160.

Functional Configuration of Server 40

Figure 5:
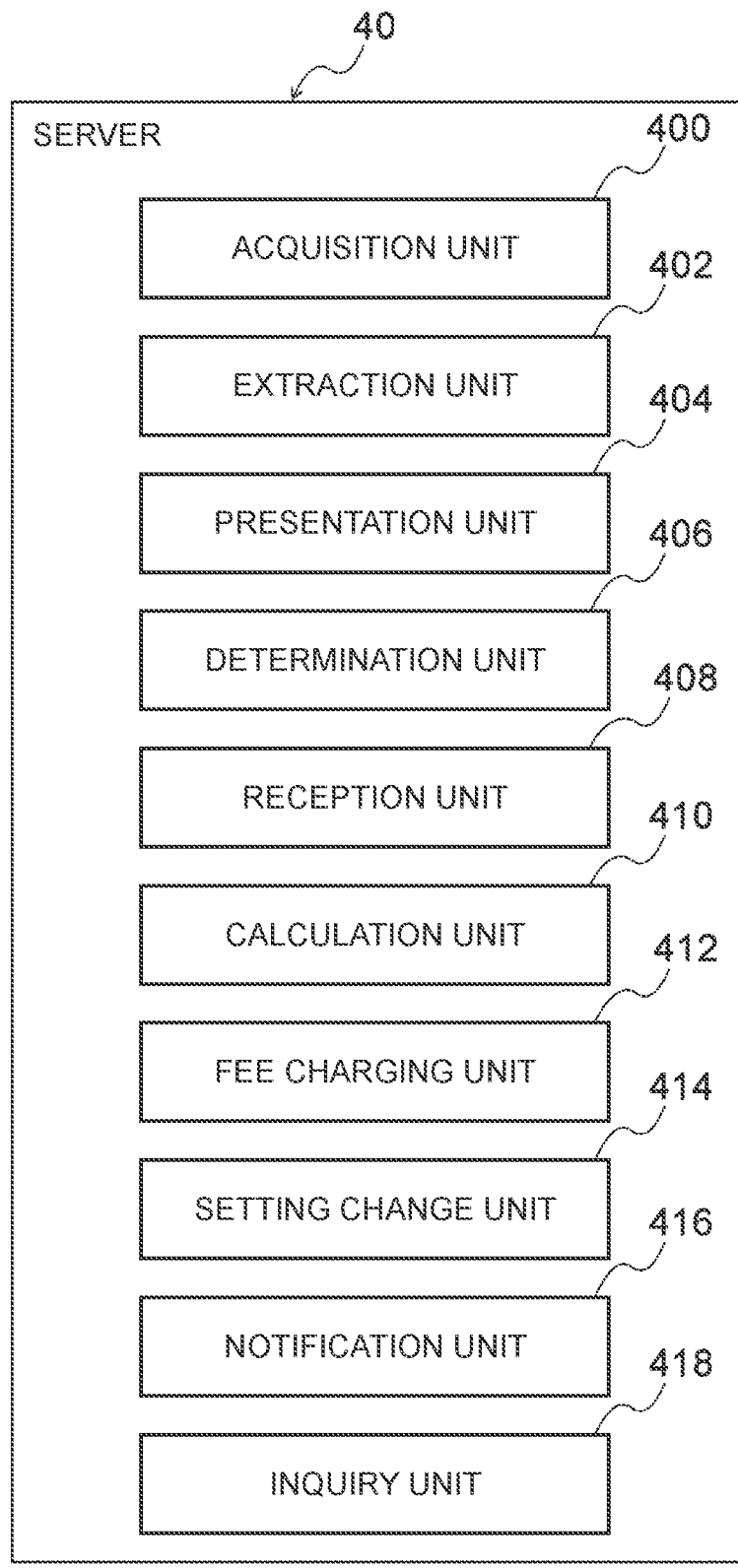
FIG. 5 is a block diagram showing a functional configuration of the server shown in FIG. 1.

As shown in FIG. 5, the server 40 functions as an acquisition unit 400, an extraction unit 402, a presentation unit 404, a determination unit 406, a reception unit 408, a calculation unit 410, a fee charging unit 412, a setting change unit 414, a notification unit 416, and an inquiry unit 418 as the CPU 40A executes the processing program 130.

The acquisition unit 400 has a function of acquiring the above-described various vehicle information 100 from the vehicle-mounted device 20 of the user's vehicle 12. The acquisition unit 400 also has a function of acquiring information related to the elapsed time since the setting was introduced to the vehicle 12. Furthermore, the acquisition unit 400 has a function of acquiring information related to the travel time zone in which the vehicle 12 travels.

The extraction unit 402 has a function of referring to the applicable vehicle reference table 150 and extracting an introduction mode of the setting that can be used in the vehicle 12, based on the vehicle information 100 such as the vehicle type, the model number, and the model year acquired by the acquisition unit 400.

The presentation unit 404 has a function of presenting, to at least one of the vehicle 12 and the terminal 30 of the user, options for the introduction mode of the setting that can be used in the vehicle 12, which is extracted by the extraction unit 402.

The determination unit 406 has a function of determining whether the user has selected the introduction mode of the setting in the vehicle 12 or the terminal 30 of the user. Further, the determination unit 406 has a function of determining whether the introduction mode selected by the user is an introduction for the normal usage or an introduction for the trial usage. Furthermore, the determination unit 406 has a function of determining whether the introduction mode selected by the user is charged or free of charge.

The determination unit 406 also has a function of referring to the application condition DB 140 and determining whether the predetermined condition related to the introduction mode for the trial usage selected by the user has an end condition. Furthermore, the determination unit 406 has a function of referring to the application condition DB 140 and determining whether the end condition is satisfied based on information such as the vehicle information 100 acquired by the acquisition unit 400.

For example, the determination unit 406 determines whether a predetermined time has elapsed since the setting was introduced to the vehicle 12, based on the information related to the elapsed time acquired by the acquisition unit 400. The introduction of the setting refers to, for example, installing software in the vehicle 12, but the timing of starting time measurement is not limited to this.

As another example, the determination unit 406 determines whether the vehicle 12 has traveled for a predetermined period of time since the setting was introduced to the vehicle 12, based on the vehicle information 100 related to the travel time. Note that, for example, the determination unit 406 may determine whether the vehicle 12 has traveled for a predetermined period of time from a predetermined date and time every month so that the user can use the setting only for a predetermined period of time every month.

As another example, the determination unit 406 determines whether the vehicle 12 has traveled a predetermined distance since the setting was introduced to the vehicle 12, based on the vehicle information 100 related to the travel distance. Note that, for example, the determination unit 406 may determine whether the vehicle 12 has traveled a predetermined distance from a predetermined date and time every month so that the user can use the setting up to a predetermined distance every month.

Further, the determination unit 406 also has a function of referring to the application condition DB 140 and determining whether the predetermined condition related to the introduction mode for the trial usage selected by the user has a usage condition. Furthermore, the determination unit 406 has a function of referring to the application condition DB 140 and determining whether the usage condition is satisfied, based on information such as the vehicle information 100 acquired by the acquisition unit 400.

For example, the determination unit 406 determines whether the vehicle 12 is traveling during a predetermined time zone, based on the information related to the travel time zone acquired by the acquisition unit 400.

As another example, the determination unit 406 determines whether the vehicle 12 is traveling along a predetermined travel route based on the vehicle information 100 related to the travel route.

As another example, the determination unit 406 determines whether the vehicle 12 is traveling in a predetermined travel area based on the vehicle information 100 related to the travel area.

As still another example, the determination unit 406 determines whether a predetermined driver is driving the vehicle 12 based on the vehicle information 100 related to the driver.

When the predetermined condition related to the introduction mode for the trial usage selected by the user has a usage condition, the determination unit 406 determines whether a predetermined period has elapsed since the introduction of the setting.

Furthermore, the determination unit 406 has a function of, when the user selects the introduction mode of the usage-based charging system, referring to the application condition DB 140 and, based on the information related to the usage amount of the setting acquired by the acquisition unit 400, determining whether the setting has been used since the previous fee charging or since the activation if the charging is performed for the first time. Here, as the information related to the usage amount, the cumulative time during which the setting was used and the cumulative distance traveled by the vehicle 12 using the setting are exemplified since the previous fee charging or since the activation if the charging is performed for the first time. Further, when the user selects the introduction mode of the usage-based charging system, the determination unit 406 determines whether a predetermined period has elapsed since the setting was introduced.

Furthermore, the determination unit 406 has a function of determining whether the user wishes to continue using the setting in response to an inquiry from an inquiry unit 418, which will be described later.

The reception unit 408 has a function of receiving an introduction mode of the setting related to driving assistance of the vehicle 12, which is presented by the presentation unit 404 and selected by the user on the vehicle 12 or the terminal 30 of the user.

The calculation unit 410 has a function of referring to the usage fee reference table 160 and calculating the usage fee of the setting in the selected introduction mode. Here, when the user selects the introduction mode of the usage-based charging system, the calculation unit 410 calculates the fee according to the usage amount based on the information on the usage amount acquired by the acquisition unit 400.

The fee charging unit 412 has a function of charging the user with the cost for using the setting, which is calculated by the calculation unit 410.

The setting change unit 414 applies the setting to the user's vehicle 12 and changes the setting of the vehicle 12. Specifically, the setting change unit 414 has a function of installing software in the vehicle 12 or activating software already installed in the vehicle 12, so that the update unit 210 of the vehicle-mounted device 20 can rewrite the driving assistance program 110. The setting change unit 414 also has a function of uninstalling the software from the vehicle 12 or deactivating the software.

Here, the setting change unit 414 has a function of, when the user selects the introduction mode for the trial usage in which the setting is applied to the vehicle 12 under a predetermined condition, applying the setting to the vehicle 12 under the predetermined condition in accordance with the user's selection received by the reception unit 408.

The notification unit 416 has a function of notifying at least one of the vehicle 12 and the terminal 30. The notification method includes a display on the display of the vehicle 12, an audio output from the speaker of the audio of the vehicle 12, a mail transmission to the terminal 30, a notification to an application downloaded to the terminal 30, and the like. Examples of notification contents include display of an introduction mode selection screen, notification of software installation, notification of activation, notification of deactivation, and notification of fee charging.

The inquiry unit 418 has a function of inquiring whether the user wishes to continue using the setting.

Example of Process Flow

Next, the flow of processes executed by the vehicle information processing system 10 will be described with reference to the flowcharts shown in FIGS. 6 to 11.

Figure 6:
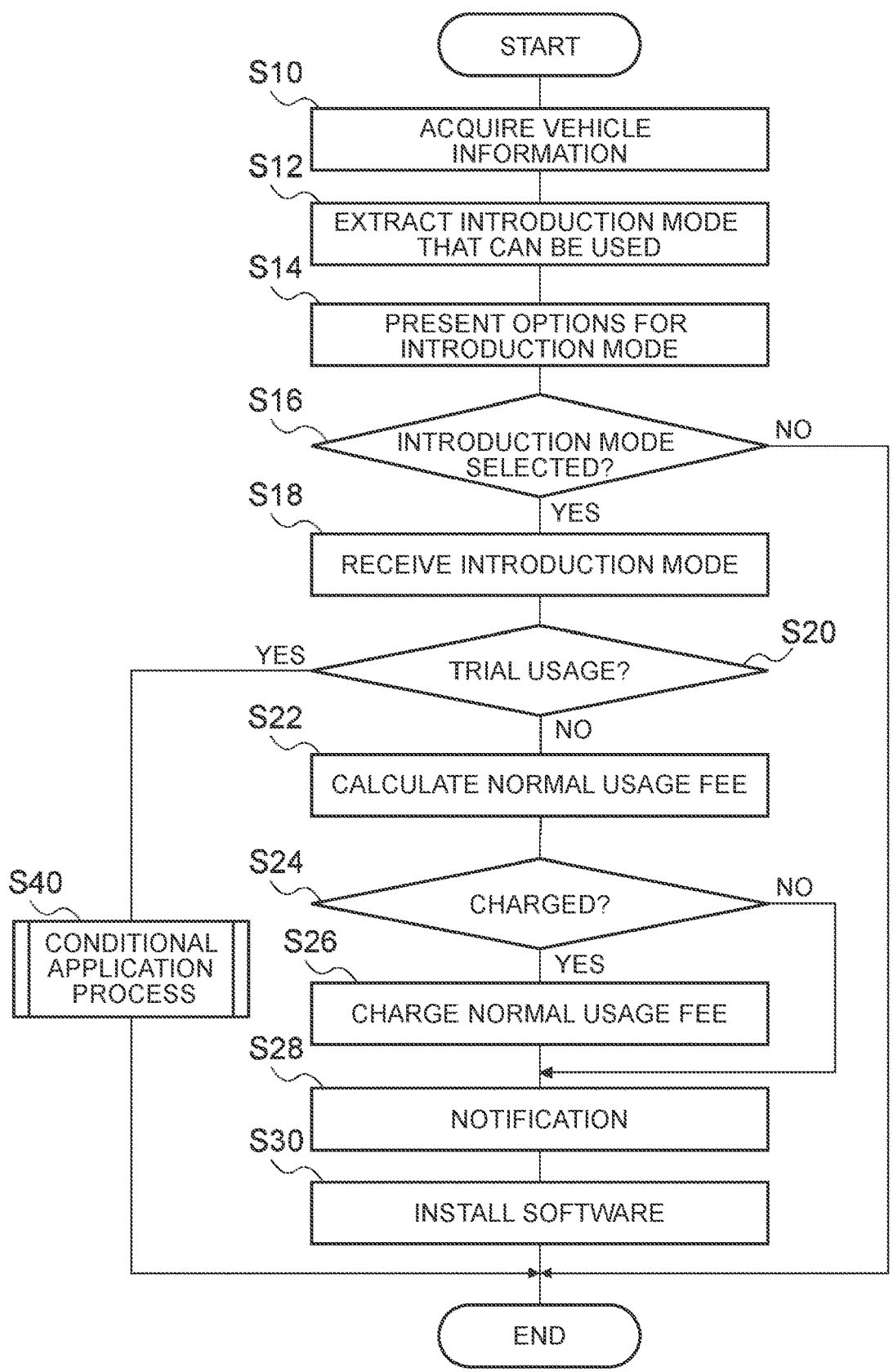
FIG. 6 is a flowchart showing the flow of processes in the vehicle information processing system shown in FIG. 1.

In step S10 of FIG. 6, the CPU 40A of the server 40 acquires the vehicle information 100 from the vehicle-mounted device 20 of the vehicle 12 of the user.

In step S12, the CPU 40A extracts the introduction mode of the setting related to driving assistance that can be used in the vehicle 12, based on the vehicle information 100.

In step S14, the CPU 40A presents, to at least one of the vehicle 12 and the terminal 30 of the user, options for the introduction mode of the setting that can be used in the vehicle 12.

In step S16, the CPU 40A determines whether the user has selected the introduction mode of the setting in the vehicle 12 or the terminal 30.

When it is determined in step S16 that the introduction mode has not been selected, the CPU 40A ends the process.

When it is determined in step S16 that the introduction mode has been selected, the CPU 40A receives the selection of the introduction mode in step S18.

In step S20, the CPU 40A determines whether the introduction mode selected by the user is an introduction for the normal usage or an introduction for the trial usage.

When it is determined in step S20 that the introduction mode selected by the user is an introduction for the normal usage, the CPU 40A calculates the usage fee for the normal usage of the setting in step S22.

In step S24, the CPU 40A determines whether the usage fee calculated in step S22 is charged or free of charge.

When it is determined in step S24 that the usage fee is charged, the CPU 40A charges the user with the fee for the normal usage of the setting in step S26.

When it is determined in step S24 that the usage fee is free of charge, the CPU 40A executes the process of step S28 without charging the user.

In step S28, the CPU 40A notifies the vehicle 12 or the terminal 30 that the software will be installed in the vehicle 12.

In step S30, the CPU 40A installs the software in the vehicle 12 and then terminates the process.

On the other hand, when it is determined in step S20 that the introduction mode selected by the user is an introduction for the trial usage, the CPU 40A executes the conditional application process in step S40.

Figure 7:
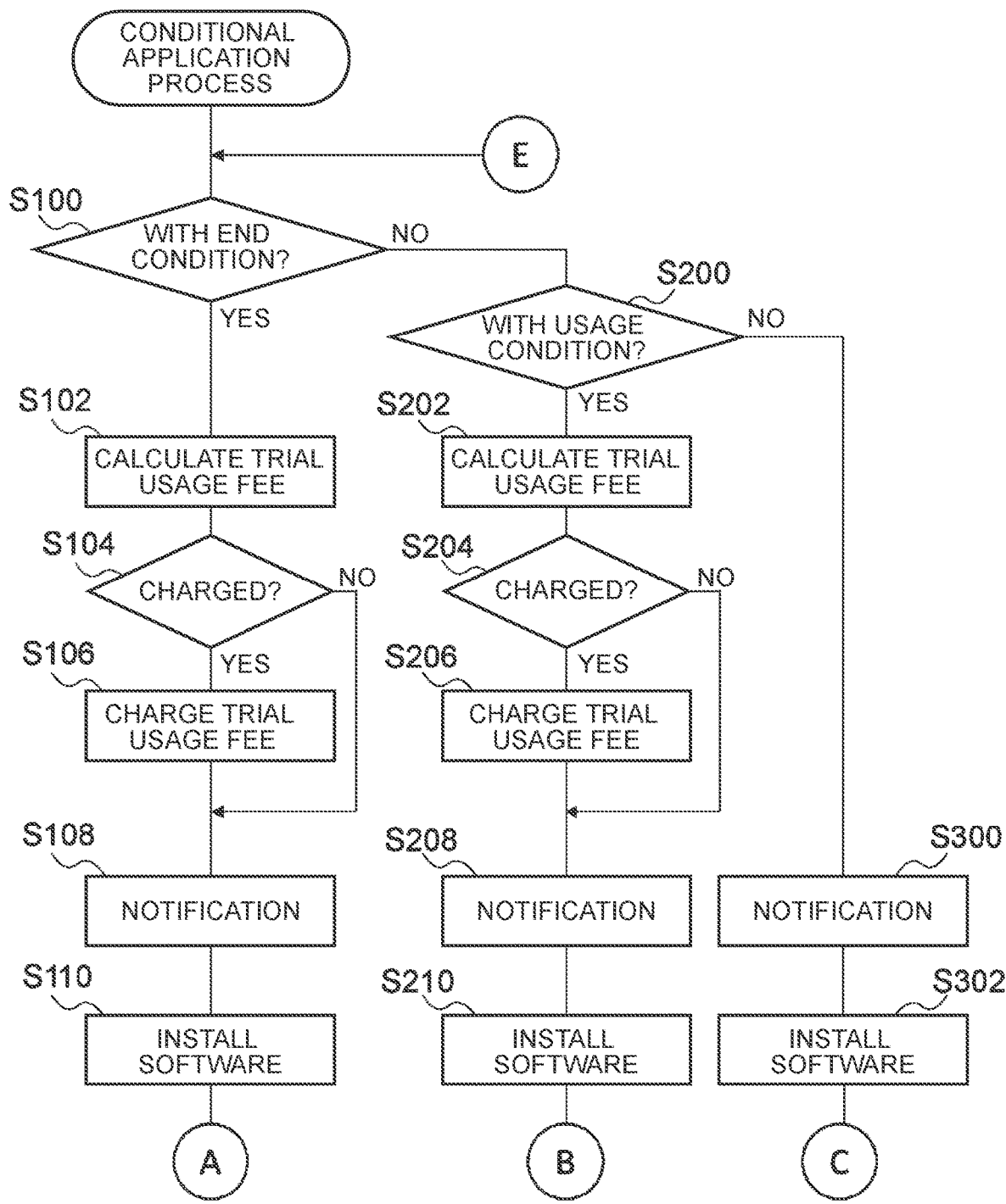
FIG. 7 is a flowchart showing the flow of a conditional application process shown in FIG. 6.

The conditional application process will be described in detail below with reference to FIG. 7.

In step S100, the CPU 40A determines whether the predetermined condition related to the introduction mode for the trial usage selected by the user has an end condition.

When it is determined in step S100 that the predetermined condition related to the introduction mode selected by the user has an end condition, the CPU 40A calculates the usage fee for the trial usage of the setting in step S102. The usage fee for the trial usage calculated here is set to be lower than the usage fee for the normal usage described above.

In step S104, the CPU 40A determines whether the usage fee calculated in step S102 is charged or free of charge.

When it is determined in step S104 that the usage fee is charged, the CPU 40A charges the user with the fee for the trial usage of the setting in step S106.

When it is determined in step S104 that the usage fee is free of charge, the CPU 40A executes the process of step S108 without charging the user.

In step S108, the CPU 40A notifies the vehicle 12 or the terminal 30 that the software will be installed in the vehicle 12.

In step S110, the CPU 40A installs the software in the vehicle 12 and then executes the process of A, which is an introduction pattern with an end condition.

On the other hand, when it is determined in step S100 that the predetermined condition related to the introduction mode for the trial usage selected by the user does not have an end condition, the CPU 40A determines in step S200 whether the predetermined condition related to the introduction mode for the trial usage selected by the user has a usage condition.

When it is determined in step S200 that the predetermined condition related to the introduction mode for the trial usage selected by the user has a usage condition, the CPU 40A calculates the usage fee for the trail usage of the setting in step S202. The usage fee for the trial usage calculated here is set to be lower than the usage fee for the normal usage described above.

Steps S204 to S208 show the same flow as steps S104 to S108, so description thereof will be omitted.

In step S210, the CPU 40A installs the software in the vehicle 12 and then executes the process of B, which is an introduction pattern with a usage condition.

On the other hand, when it is determined in step S200 that the predetermined condition related to the introduction mode for the trial usage selected by the user does not have a usage condition, the CPU 40A notifies the vehicle 12 or the terminal 30 in step S300 that the software will be installed in the vehicle 12.

In step S302, the CPU 40A installs the software in the vehicle 12 and then executes the process of C, which is the introduction pattern of the usage-based charging system.

Introduction Process A with End Condition

Figure 8:
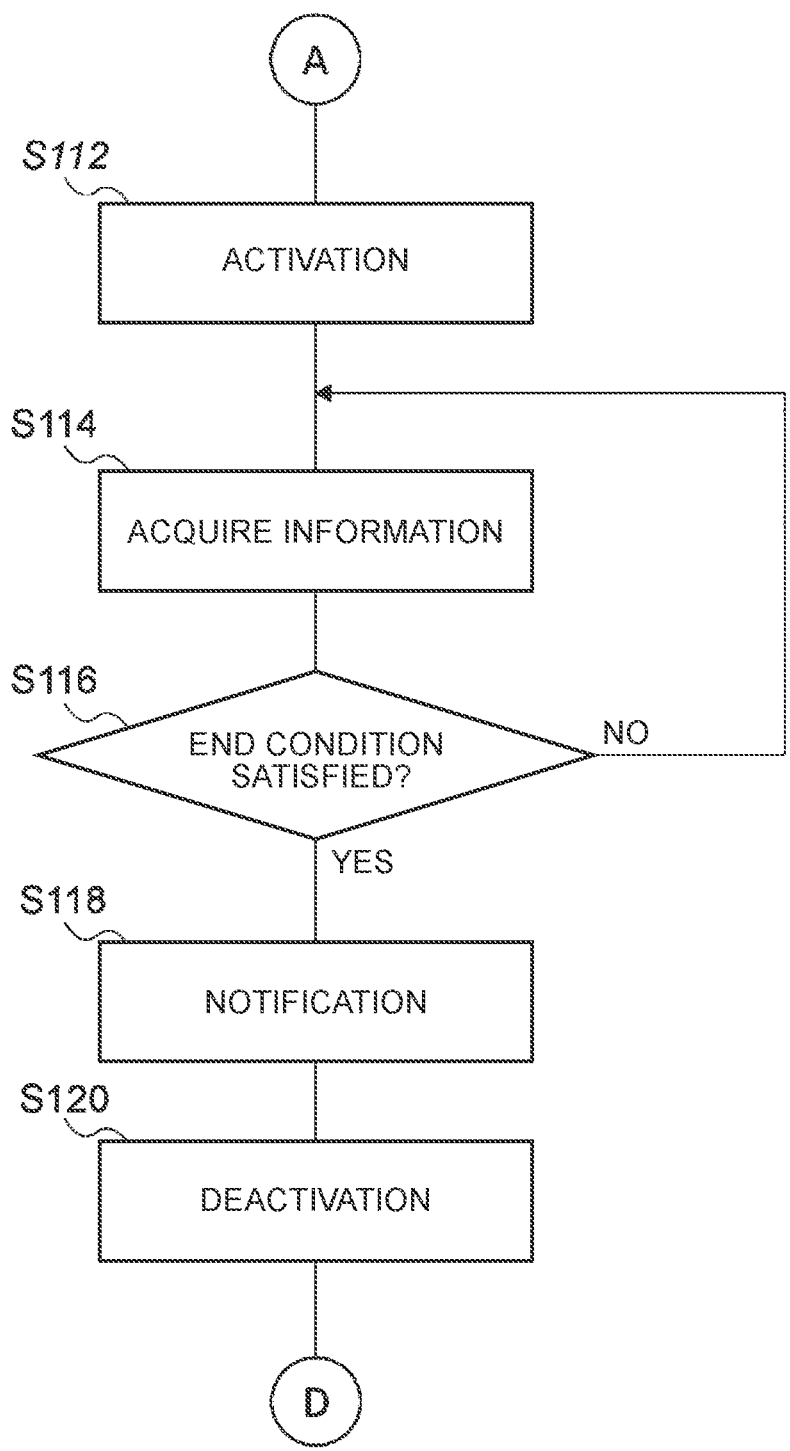
FIG. 8 is a flowchart showing the flow of processes following A in FIG. 7.

The introduction process A with the end condition will be described in detail below with reference to FIG. 8.

In step S112, the CPU 40A activates the software installed in the vehicle 12.

In step S114, the CPU 40A acquires the information related to the elapsed time, the vehicle information 100 related to the travel time, or the vehicle information 100 related to the travel distance in accordance with the introduction mode selected by the user.

In step S116, based on the acquired information, the CPU 40A determines whether the end condition corresponding to the introduction mode selected by the user is satisfied. For example, the CPU 40A determines whether a predetermined period of time has elapsed since the software was installed in the vehicle 12, based on the information related to the elapsed time.

When it is determined in step S116 that the end condition is not satisfied, the CPU 40A executes the process of step S114 again.

When it is determined in step S116 that the end condition is satisfied, the CPU 40A notifies the user of the deactivation in step S118, performs the deactivation in step S120, and executes the inquiry process of D.

Introduction Process B with Usage Condition

Figure 9:
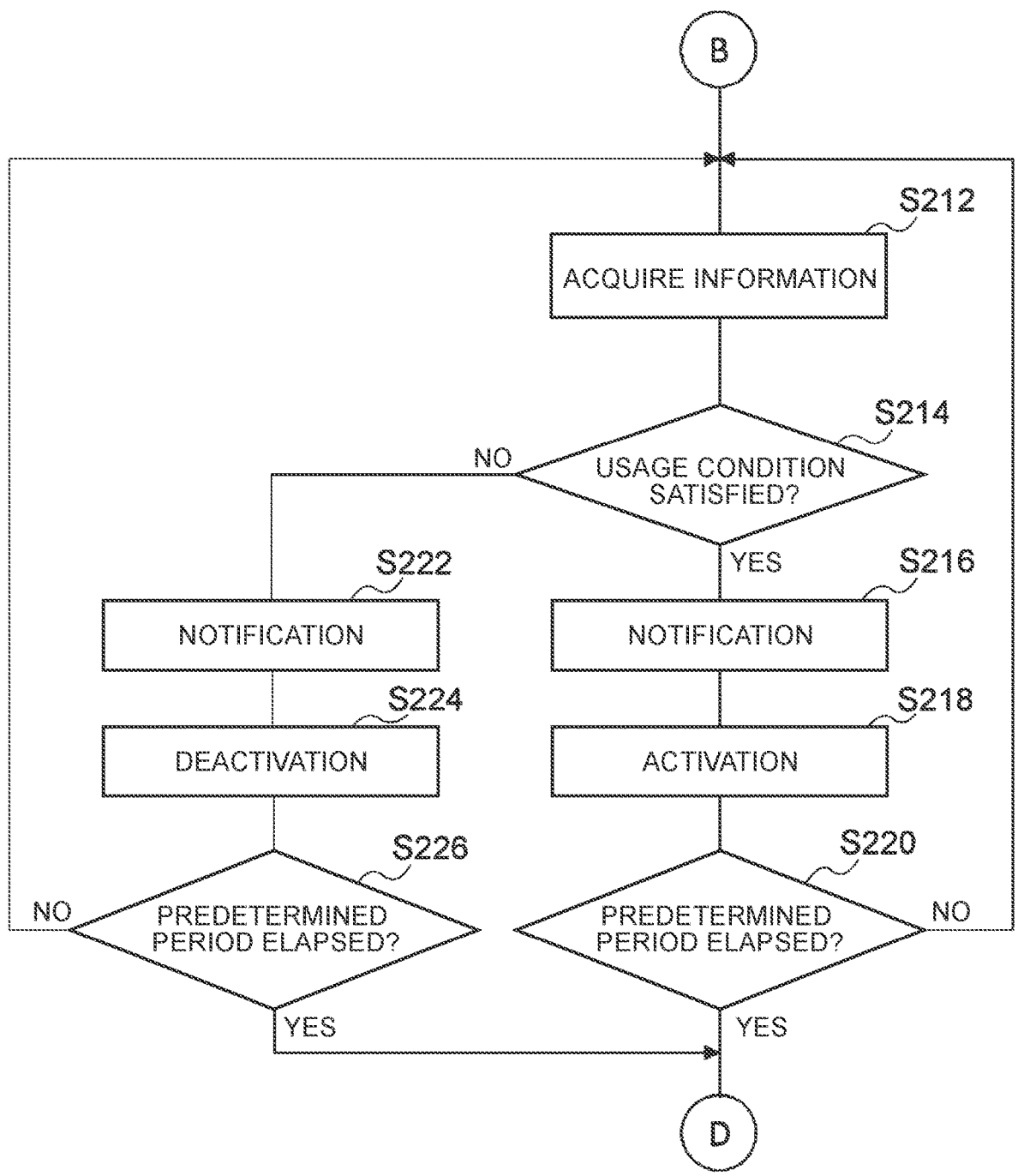
FIG. 9 is a flowchart showing the flow of processes following B in FIG. 7.

Next, the introduction process B with the usage condition will be described in detail with reference to FIG. 9.

In step S212, the CPU 40A acquires the information related to the travel time zone, the vehicle information 100 related to the travel route, the vehicle information 100 related to the travel area, or the vehicle information 100 related to the driver in accordance with the introduction mode selected by the user.

In step S214, based on the acquired information, the CPU 40A determines whether the usage condition corresponding to the introduction mode selected by the user is satisfied. For example, the CPU 40A determines whether the vehicle 12 is traveling during a predetermined time zone, based on the information related to the travel time zone.

When it is determined in step S214 that the usage condition is satisfied, the CPU 40A notifies in step S216 that the software installed in the vehicle 12 will be activated, and activates the software in step S218.

In step S220, the CPU 40A determines whether a predetermined period has elapsed since the setting was introduced. For example, it is determined whether a predetermined period has elapsed since the software was installed in the vehicle 12 in step S210.

When it is determined in step S220 that the predetermined period has not elapsed, the CPU 40A executes the process of step S212 again.

On the other hand, when it is determined in step S220 that the predetermined period has elapsed, the CPU 40A executes the inquiry process of D.

When it is determined in step S214 that the usage condition is not satisfied, the CPU 40A notifies the vehicle 12 in step S222 that the software will be deactivated, and deactivates the software in step S224.

In step S226, the CPU 40A determines whether a predetermined period has elapsed since the setting was introduced, as in step S220. Since the subsequent flow is the same as that of step S220, description thereof is omitted.

Introduction Process C of Usage-Based Charging System

Figure 10:
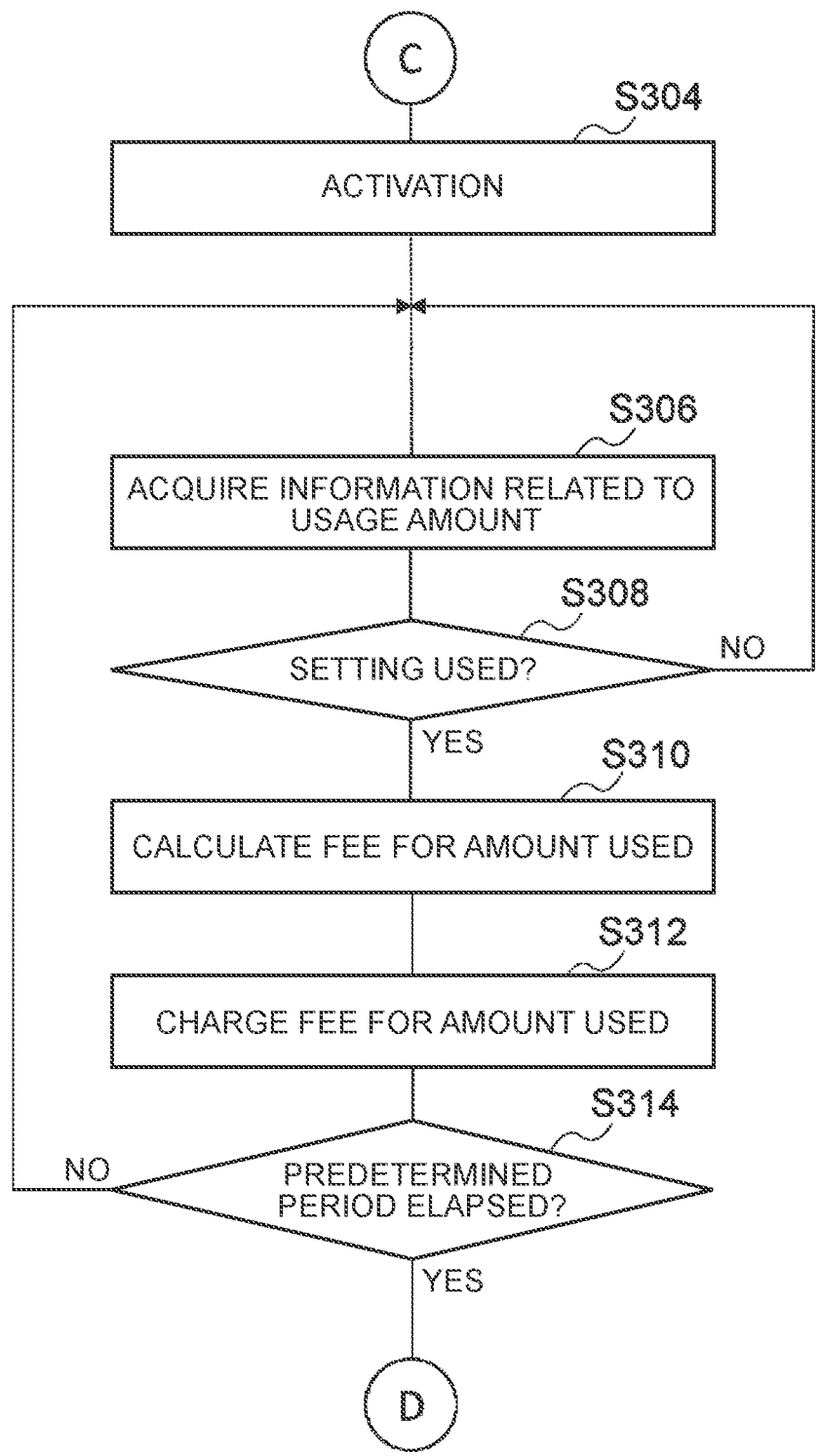
FIG. 10 is a flowchart showing the flow of processes following C in FIG. 7.
Figure 11:
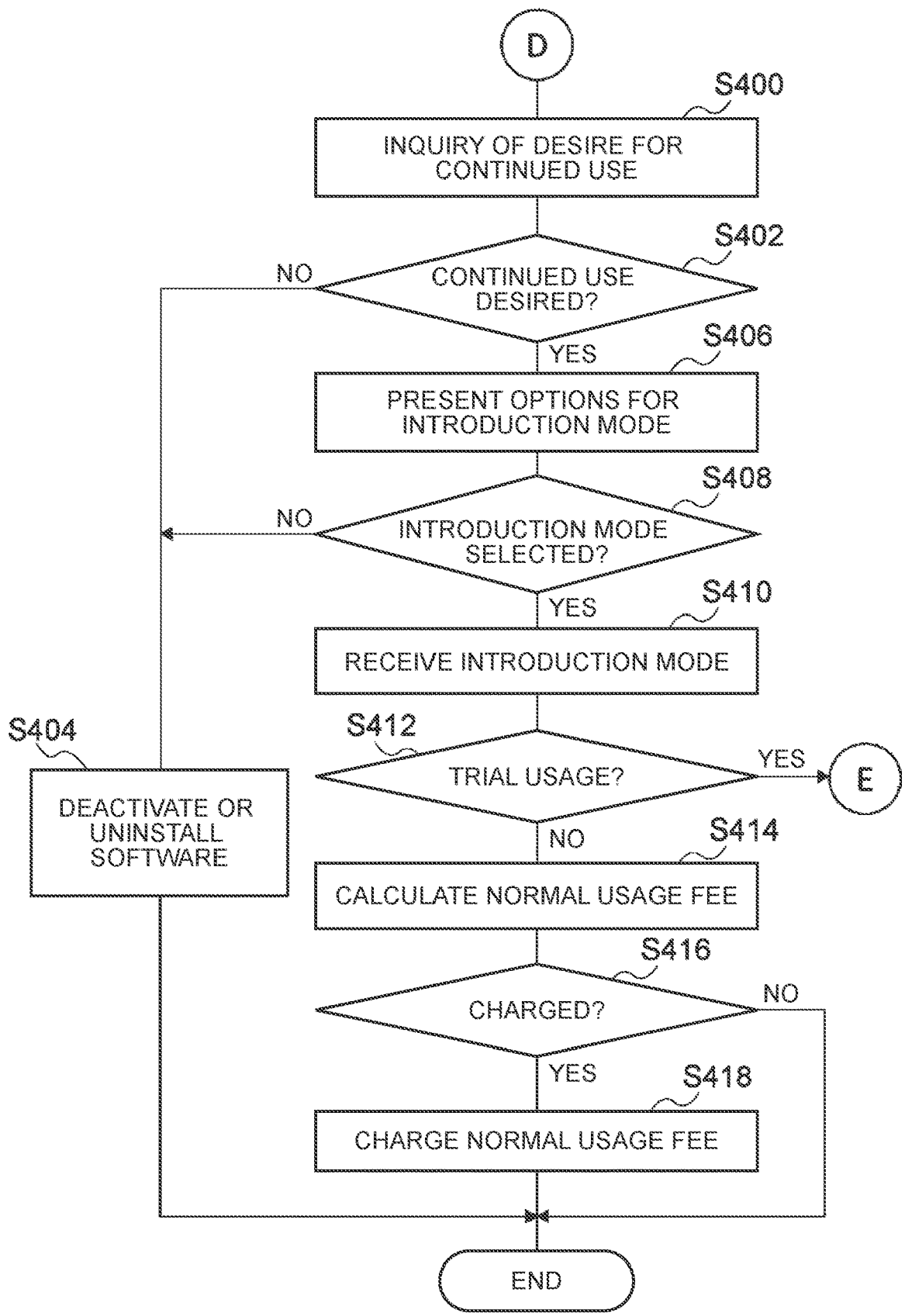
FIG. 11 is a flowchart showing the flow of processes following D in FIGS. 8 to 10.

Next, the introduction process C of the usage-based charging system will be described in detail with reference to FIG. 10.

In step S304, the CPU 40A activates the software installed in the vehicle 12.

In step S306, the CPU 40A acquires from the vehicle 12 information related to the usage amount of the setting in accordance with the introduction mode selected by the user.

In step S308, the CPU 40A determines whether the setting has been used since the previous fee charging or since the activation of step S304 if the charging is performed for the first time, based on the information related to the usage amount.

When it is determined in step S308 that the setting has not been used, the CPU 40A executes the process of step S306 again.

On the other hand, when it is determined in step S308 that the setting has been used, the CPU 40A calculates the fee for the amount used as the trial usage fee in step S310. For example, the CPU 40A calculates the trial usage fee in accordance with the cumulative time the setting has been used since the previous fee charging or since the activation if the charging is performed for the first time.

In step S312, the CPU 40A charges the user with the fee for the amount used calculated in step S310.

In step S314, the CPU 40A determines whether a predetermined period has elapsed since the setting was introduced. For example, it is determined whether a predetermined period has elapsed since the software was activated in step S304.

When it is determined in step S314 that the predetermined period has not elapsed, the CPU 40A executes the process of step S306 again.

On the other hand, when it is determined in step S314 that the predetermined period has elapsed, the CPU 40A executes the inquiry process of D.

Inquiry Process D

In step S400, the CPU 40A inquires of the user whether he or she wishes to continue using the setting.

In step S402, the CPU 40A determines whether the user wishes to continue using the setting.

When it is determined in step S402 that the user does not wish to continue using the setting, the CPU 40A deactivates the software in step S404 if the software has been activated, and terminates the process. Note that the CPU 40A may uninstall the software in step S404.

On the other hand, when it is determined in step S402 that the user wishes to continue using the setting, the CPU 40A re-presents options for the introduction mode on at least one of the vehicle 12 and the terminal 30 of the user in step S406. It should be noted that, when the user wishes to continue using the setting, the process may be executed in the same introduction mode without re-presenting the user with the options for the introduction mode. In this case, from step S402, the process returns to the process of A of FIG. 8, B of FIG. 9, or C of FIG. 10 in accordance with the introduction mode that has been used by the user and then the process is executed. When the server 40 performs this control, the user loses the opportunity to select the introduction mode again, but the user's troubles related to continued use can be further reduced.

In step S408, the CPU 40A determines whether the user has selected the introduction mode of the setting in the vehicle 12 or the terminal 30.

When it is determined in step S408 that the introduction mode has not been selected, the CPU 40A executes the process of step S404.

When it is determined in step S408 that the introduction mode has been selected, the CPU 40A receives the selection of the introduction mode in step S410.

In step S412, the CPU 40A determines whether the introduction mode selected by the user is the introduction for the normal usage or the introduction for the trial usage.

When it is determined in step S412 that the introduction mode selected by the user is the introduction for the normal usage, the CPU 40A calculates the usage fee for the normal usage of the setting in step S414.

In step S416, the CPU 40A determines whether the usage fee calculated in step S414 is charged or free of charge.

When it is determined in step S416 that the usage fee is charged, the CPU charges the user with the fee for the normal usage of the setting in step S418 and terminates the process.

When it is determined in step S416 that the usage fee is free of charge, the CPU 40A terminates the process without charging the user.

On the other hand, when it is determined in step S412 that the introduction mode selected by the user is the introduction for the trial usage, step S100 of FIG. 7 is executed again.

Operation of Present Embodiment

According to the vehicle information processing system 10 having the server 40 of the present embodiment, when the user selects an introduction mode of the setting related to driving assistance of the vehicle 12, the selection is received by the reception unit 408 of the server 40. Here, when the user selects the introduction mode for the trial usage in which the setting is applied to the vehicle 12 under a predetermined condition, the setting change unit 414 of the server 40 applies the setting to the vehicle 12 under the predetermined condition corresponding to the user's selection. In other words, the user can use the setting of interest under a predetermined condition for trial usage. Therefore, even a user who hesitates to apply the setting to the vehicle 12 as the introduction for the normal usage without conditions can easily apply the setting to the vehicle 12.

Further, when the user selects the introduction mode with an end condition, the acquisition unit 400 acquires information related to any one of the elapsed time, the travel time, and the travel distance. Furthermore, based on the acquired information, the determination unit 406 determines whether a predetermined end condition corresponding to the user's selection is satisfied.

When the determination unit 406 determines that the end condition is satisfied, that is, in any one of the cases where a predetermined time has elapsed since the introduction of the setting, the vehicle 12 has traveled for a predetermined period of time since the introduction of the setting, and the vehicle 12 has traveled a predetermined distance since the introduction of the setting, the setting change unit 414 cancels the application of the setting to the vehicle 12. This allows the user to use the setting of interest for the trial usage only for a predetermined period of time or a predetermined distance. Therefore, the application of the setting to the vehicle 12 is automatically canceled without the user performing complicated operations.

Further, when the user selects the introduction mode with a usage condition, the acquisition unit 400 acquires information related to any one of the travel time zone, the travel route, the travel area, and the driver. Furthermore, based on the acquired information, the determination unit 406 determines whether a predetermined usage condition corresponding to the user's selection is satisfied.

Here, the setting is not applied to the vehicle 12 unless the vehicle 12 is used under a predetermined usage condition set in advance. On the other hand, when the determination unit 406 determines that the usage condition is satisfied, that is, in any one of the cases where the vehicle 12 travels during a predetermined time zone, the vehicle 12 travels along a predetermined route, the vehicle 12 travels in a predetermined area, and a predetermined driver drives the vehicle 12, the setting change unit 414 applies the setting to the vehicle 12. Therefore, the user can use the setting of interest for the trial usage only when using the vehicle 12 under a predetermined usage condition that the user has determined necessary and selected. For example, the user can use a setting related to driving assistance only during commuting time zones.

Further, when the user selects the introduction mode of the usage-based charging system, the acquisition unit 400 acquires information related to the usage amount of at least one of the time the setting was used and the distance traveled by the vehicle 12 using the setting. Furthermore, based on the acquired information related to the usage amount, the fee charging unit 412 charges the user with the fee corresponding to the usage amount. Therefore, the user can use the setting of interest for the trial usage by paying the fee only for the amount used.

Further, the inquiry unit 418 inquires of the user whether he or she wishes to continue using the setting. When the user does not wish to continue using the setting in response to the inquiry by the inquiry unit 418, the setting change unit 414 cancels the application of the setting to the vehicle 12. On the other hand, when the user wishes to continue using the setting in response to the inquiry by the inquiry unit 418, the setting change unit 414 maintains the state in which the setting can be used.

In particular, according to the server 40 of the present embodiment, when the user wishes to continue using the setting, the user is re-presented with options for the introduction mode. As a result, the user can continue the same introduction mode, use the setting again in another introduction mode for the trial usage, or introduce the setting as the normal usage. For example, when the user likes the setting used for the trial usage, the user can introduce the setting as the normal usage.

Further, according to the server 40 of the present embodiment, the user can use not only the charged introduction mode but also the introduction mode that is free of charge for the trial usage.

Supplementary Description of Above Embodiment

In the above embodiment, it has been described that the introduction mode presented by the server 40 includes the introduction mode for the normal usage, but the present disclosure is not limited to this, and the server 40 may present only the introduction mode for the trial usage to the user.

Further, in the above embodiment, it has been described that the server 40 presents all of the introduction mode with an end condition, the introduction mode with a usage condition, and the introduction mode of the usage-based charging system, but the present disclosure is not limited to this. For example, the server 40 may present only the introduction mode with an end condition to the user.

Furthermore, in the above embodiment, it has been described that the inquiry unit 418 inquires of the user whether he or she wishes to continue using the setting, but the present disclosure is not limited to this. For example, when the trial usage ends, the server 40 may end the process without asking the user whether he or she wishes to continue using the setting. Further, for example, when the trial usage ends, the server 40 may perform a process of shifting to the normal usage without inquiring of the user whether he or she wishes to continue using the setting.

Furthermore, in the above embodiment, it has been described that the notification unit 416 performs the display of the introduction mode selection screen, the notification of the software installation, the notification of the activation, the notification of the deactivation, the notification of fee charging, and the like. However, the present disclosure is not limited to this, and the notification unit 416 may not be provided in the server 40.

Further, in the above embodiment, it has been described that the CPU 40A determines in step S314 whether a predetermined period has elapsed since the setting was introduced, and when the predetermined period has elapsed, the user is inquired in step S400 as to whether he or she wishes to continue using the setting. However, the present disclosure is not limited to this. For example, the determination unit 406 may determine whether the cumulative charging fee corresponding to the usage amount since the introduction of the setting has exceeded the normal usage fee. In this case, the user can receive an inquiry as to whether he or she wishes to continue using the setting when the trial usage fee exceeds the normal usage fee. Therefore, it is possible to prevent the trial usage fee from exceeding the normal usage fee without the user recognizing it. Further, for example, the CPU 40A may automatically charge the normal usage fee to the user when the cumulative charging fee corresponding to the usage amount since the introduction of the setting exceeds the normal usage fee. This can prevent the user from paying a usage fee that exceeds the normal usage fee. In either case, the user's reluctance to introduce a setting to the vehicle 12 can be further alleviated.

What is claimed is:

1. A vehicle information processing system comprising:
a vehicle information processing device comprising:
 a server configured to:
  receive a selection by a user of an introduction mode of a setting related to driving assistance of a vehicle;
  apply the setting to the vehicle under a predetermined condition in accordance with the selection by the user, the selection being a selection that has been received by the server, when the user selects an introduction mode for trial usage in which the setting is applied to the vehicle under the predetermined condition;
  acquire information related to a usage amount of at least one of a time when the setting was used and a distance traveled by the vehicle using the setting; and
  charge the user with a fee corresponding to the usage amount based on the information related to the usage amount acquired; and
 a vehicle-mounted device that controls the vehicle in accordance with the setting.

2. The vehicle information processing system according to claim 1, wherein the server is configured to cancel an application of the setting to the vehicle when a predetermined end condition set in advance is satisfied.

3. The vehicle information processing system according to claim 2, wherein the server is further configured to:
 acquire information related to any one of an elapsed time, a travel time, and a travel distance; and
 determine whether the end condition is satisfied based on the information acquired, wherein
 the end condition is any one of a case where a predetermined time has elapsed since an introduction of the setting, the vehicle has traveled for a predetermined time since the introduction of the setting, and the vehicle has traveled for a predetermined distance since the introduction of the setting, in accordance with the information acquired, and
 cancel the application of the setting to the vehicle when the determination is that the end condition is satisfied.

4. The vehicle information processing system according to claim 1, wherein the server is configured to not apply the setting to the vehicle when the vehicle is not used under a predetermined usage condition set in advance, and apply the setting to the vehicle when the vehicle is used under the usage condition.

5. The vehicle information processing system according to claim 4, server is configured to:
 acquire information related to any one of a travel time zone, a travel route, a travel area, and a driver of the vehicle; and
 determine whether the usage condition is satisfied based on the information acquired, wherein
 the usage condition is any one of a case where the vehicle travels in a predetermined time zone, the vehicle travels on a predetermined route, the vehicle travels in a predetermined area, and a predetermined driver drives the vehicle, in accordance with the information acquired, and
 does not apply the setting to the vehicle when the determination is that the usage condition is not satisfied, and apply the setting to the vehicle when the determination unit determines that the usage condition is satisfied.

6. The vehicle information processing system according to claim 1, where the server is further configured to inquire of the user whether the user wishes to continue using the setting, wherein the server cancels application of the setting to the vehicle when the user does not wish to continue using the setting in response to an inquiry, and maintains a usable state of the setting when the user wishes to continue using the setting in response to the inquiry.

7. A vehicle information processing method comprising:
 receiving a selection by a user of an introduction mode of a setting related to driving assistance of a vehicle;
 applying the setting to the vehicle under a predetermined condition in accordance with the selection by the user, when the user selects an introduction mode for trial usage in which the setting is applied to the vehicle under the predetermined condition
 acquiring information related to a usage amount of at least one of a time when the setting was used and a distance traveled by the vehicle using the setting;
 charging the user with a fee corresponding to the usage amount based on the information related to the usage amount acquired; and
 controlling the vehicle in accordance with the setting.

* * * * *